(12) United States Patent
Goss et al.

(10) Patent No.: US 6,880,897 B2
(45) Date of Patent: Apr. 19, 2005

(54) HUB ADAPTER FOR A BICYCLE DISC BRAKE

(75) Inventors: Eric Goss, North Vancouver (CA); Daryl D. Musselman, North Vancouver (CA)

(73) Assignee: First Principles Performance Products Ltd., North Vancouver (CA)

( * ) Notice: Subject to any disclaimer, the term of this patent is extended or adjusted under 35 U.S.C. 154(b) by 6 days.

(21) Appl. No.: 10/338,848

(22) Filed: Jan. 9, 2003

(65) Prior Publication Data

US 2003/0151300 A1 Aug. 14, 2003

Related U.S. Application Data

(60) Provisional application No. 60/346,276, filed on Jan. 9, 2002.

(51) Int. Cl.[7] ............................ B60B 19/00; B60B 1/02; B60B 27/00; B62L 3/00
(52) U.S. Cl. ........................ 301/6.9; 301/59; 301/110.5; 188/24.11
(58) Field of Search .......................... 301/110.5, 105.1, 301/109–110, 110.6, 6.1, 6.8, 6.9, 59, 104; 188/218 XL, 18 A, 26, 24.11, 382

(56) References Cited

U.S. PATENT DOCUMENTS

| | | | |
|---|---|---|---|
| 3,985,391 A | * | 10/1976 | Hoffman et al. ............. 301/6.9 |
| 3,989,124 A | | 11/1976 | Fujii |
| 4,074,910 A | * | 2/1978 | Hoffman et al. ......... 280/288.4 |
| 5,193,833 A | | 3/1993 | Reisinger |
| 5,607,031 A | | 3/1997 | Hollars |
| 5,632,362 A | | 5/1997 | Leitner |
| 5,957,244 A | | 9/1999 | Turner |
| 6,076,896 A | | 6/2000 | Bertetti et al. |
| 6,148,964 A | | 11/2000 | Huang |
| 6,206,144 B1 | | 3/2001 | Di Bella |
| 6,309,028 B1 | | 10/2001 | Kanehisa et al. |
| 6,318,810 B1 | * | 11/2001 | Miyake et al. ........... 301/110.5 |
| 6,336,531 B1 | | 1/2002 | Chou |
| 6,371,252 B1 | * | 4/2002 | Kanehisa ..................... 188/26 |
| 6,634,665 B1 | * | 10/2003 | Hargroder ................ 280/304.1 |
| 2002/0139622 A1 | * | 10/2002 | Chen .................... 188/218 XL |

FOREIGN PATENT DOCUMENTS

| EP | 1 122 096 A2 | 8/2001 |
|---|---|---|
| EP | 1 122 097 A2 | 8/2001 |

* cited by examiner

*Primary Examiner*—Russell D. Stormer
*Assistant Examiner*—Jason R. Bellinger
(74) *Attorney, Agent, or Firm*—Vermette & Co.

(57) ABSTRACT

A hub adapter used to modify a bicycle wheel hub to provide for the mounting of a disc brake rotor and/or for the repositioning of the wheel spoke mount flange to accommodate the additional components of a disc brake system. The hub adapter may be fixed to the host non-disc wheel hub by fastening bolts passing through the original spoke mounting holes or by other fastening means. The hub adapter may provide standard mounting holes for a disc brake rotor to be fixed to the hub adapter with fastening bolts. The hub adapter provides alternate spoke mounting holes on an alternate spoke flange, positioned in such a way so as to provide adequate clearance for disc brake components such as the disc brake caliper assembly, or in such a way as to change the length of the spokes and to modify the wheel stiffness. The hub adapter effectively becomes integral to the host wheel hub and critical to the primary function of the wheel hub, that is transferring load from the frame to the wheel.

22 Claims, 14 Drawing Sheets

SECTION A-A

SECTION D-D

FIGURE 13

HUB ADAPTER FOR A BICYCLE DISC BRAKE

RELATED APPLICATIONS

This application claims the benefit of Provisional Patent Application No. 60/346,276, filed Jan. 9, 2002, by Eric Goss and Daryl Musselman, entitled HUB ADAPTER FOR BICYCLE DISC BRAKE.

FIELD OF THE INVENTION

This invention relates, in general, to wheel hubs and to the mounting of disc brake systems on wheel hubs that were not specifically designed to receive disc brake system components.

BACKGROUND OF THE INVENTION

Bicycles delivered prior to 1996, especially mountain bikes, were most often equipped with V-brakes or rim-brakes where a cable actuated cantilever system effectively pinched the wheel rim between two rubber brake pads. Bicycles equipped with such brakes were also equipped with non-disc wheel hubs. Alternatively, bicycle disc-brake systems utilize a frame mounted caliper assembly that squeezes brake pads on a dedicated brake rotor, similar to systems used on modern motorcycles and automobiles. By 2002, the majority of high-end mountain bikes were sold with disc brake systems as standard equipment. Bicycles equipped with such disc-brake systems are equipped with disc-ready wheel hubs, designed specifically to accept the mounting of a dedicated brake rotor. Moving into the future, both rim-brake systems and disc-brake systems will continue to share the market and wheel hub manufacturers will continue to satisfy the needs of both competing systems.

The primary function of a wheel hub is to transfer the load of the vehicle and operator, the stationary part, to the rotating wheel, the moving part, through a wheel bearing assembly. In the case of bicycles, this load transfer is generally accomplished by a single piece wheel hub to which wheel spokes are attached, and within which wheel bearings are housed. Currently manufacturers generally supply two different types of wheels and/or hubs, one being non-disc wheels or hubs (i.e. wheels/hubs not designed to mount a disc brake rotor) and the other being disc wheels or hubs (i.e. wheels/hubs designed to mount a disc brake rotor). Accordingly there is a need for a means for adapting non-disc wheels and hubs to disc wheels and hubs.

SUMMARY OF THE INVENTION

The present invention relates to a hub adapter for adapting a non-disc specific wheel hub to securely mount a disc brake rotor, to modify the spoke mounting position so as to provide clearance for other disc brake system components, such as the disc brake caliper assembly, and to modify the performance of the wheel assembly. The hub adapter has a hub mounting face for fastening said hub adapter to said hub, an adapter spoke flange for fastening spokes of said wheel, and a rotor mounting face for fastening said rotor to said hub adapter.

The rotor mounting face is located to allow for the proper positioning and function of the disc brake rotor within the disc brake caliper assembly. Furthermore, the rotor mounting face provides fastening points that are used to secure the disc brake rotor.

The new spoke mounting flange is located so as to position the wheel spokes in such a way as to eliminate any potential interference between the wheel spokes and a disc brake caliper assembly. Furthermore, this flange may be located in such a way as to modify the performance of the wheel by affecting its stiffness and/or lateral stability.

The hub adapter is securely fastened to the host wheel hub in such a way as to become integral to the host wheel hub. In the preferred embodiment, threaded holes in the hub adapter are located in alignment with holes on the spoke flange of the host wheel hub. Threaded fasteners pass through the holes on the spoke flange of the host wheel hub and are threaded into the holes provided in the hub adapter to securely fasten the hub adapter to the host wheel hub. The invention is not specific to any particular brand or model of wheel hub. In addition, the invention can be designed to fasten securely and function correctly in cooperation with many different types of bicycle wheel hubs, and to accommodate many different types of disc brake calipers and components. Furthermore, the invention applies equally to both the front and rear wheels of bicycles as well as wheels of other vehicles, such as wheelchairs, etc.

BRIEF DESCRIPTION OF THE DRAWINGS

The invention itself both as to organization and method of operation, as well as additional objects and advantages thereof, will become readily apparent from the following detailed description when read in connection with the accompanying drawings, wherein.

DETAILED DESCRIPTION OF THE PREFERRED EMBODIMENT

Figure 1:
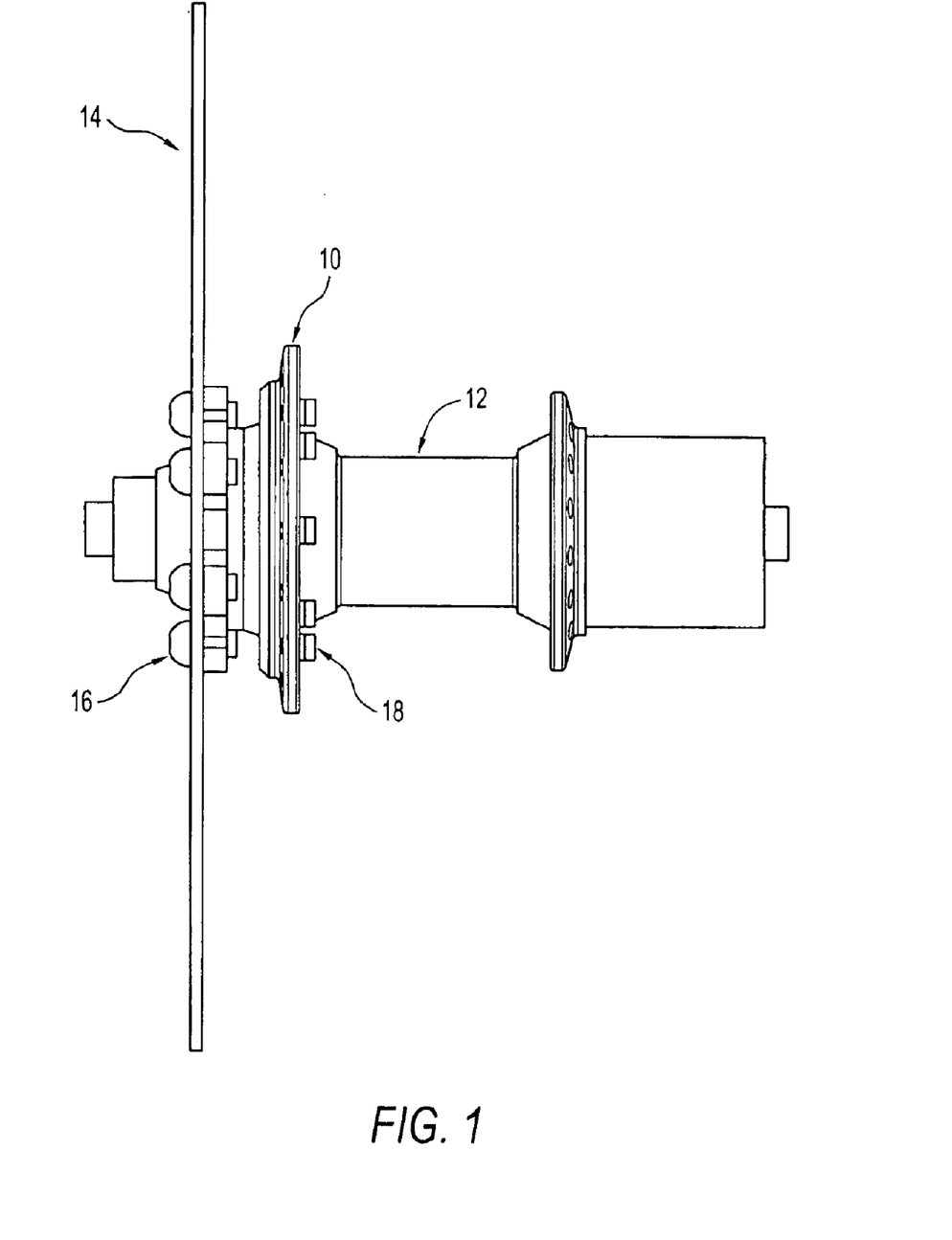
FIG. 1 is a side view of a hub adapter mounted on a standard non-disc bicycle wheel hub.

Shown in FIG. 1 is a hub adapter 10 of the present invention. The hub adapter 10 is shown fastened to a non-disc specific bicycle wheel hub 12 (i.e. the bicycle wheel hub 12 is not specifically designed to accept a disc brake rotor). The disc brake rotor 14 is shown fastened to the hub adapter 10 by threaded rotor fasteners 16. The hub adapter 10 is shown fastened to the bicycle wheel hub 12 by threaded hub fasteners 18.

Figure 2:
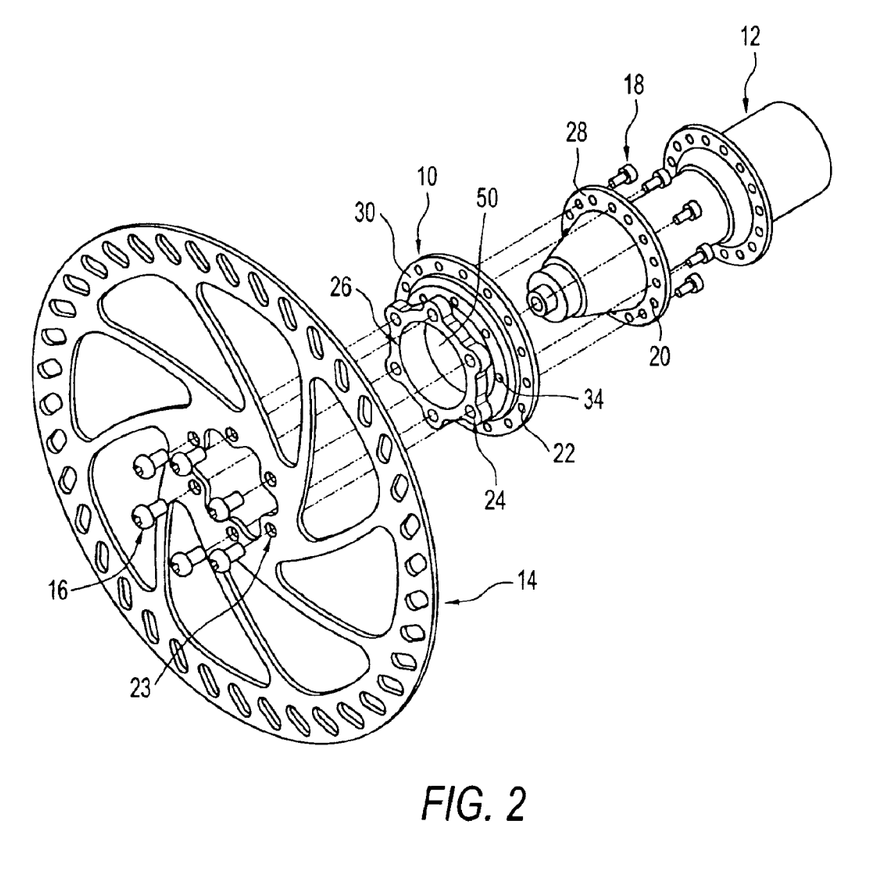
FIG. 2 is an exploded isometric view of the hub adapter and various components in FIG. 1.

FIG. 2 is an exploded isometric view of the various components shown in FIG. 1. The bicycle wheel hub 12 is inserted into the large center hole 50 of the hub adapter 10 so as to allow the spoke flange 28 on the bicycle wheel hub 12 to sit flush against the hub mounting face (not shown) of the hub adapter 10 and to be integrally secured by threaded hub fasteners 18. The threaded hub fasteners 18 are shown to pass through the spoke holes 20 on the bicycle wheel hub 12 and into the threaded holes 34 on the hub adapter 10. It can be appreciated that the spoke holes 20 are not available to receive wheel spokes when the bicycle wheel hub 12 and the hub adapter 10 are fastened together. New spoke holes 22 are provided on hub spoke flange 30 of the hub adapter 10 to allow wheel spokes to be installed.

FIG. 2 further shows the threaded rotor fasteners 16 passing through existing holes 23 on the disc brake rotor 14 and into the threaded receiving holes 24 provided in the rotor mounting face of the rotor mounting flange 27. The disc brake rotor 14 then sits flush against the rotor mounting face 26 of the rotor mounting flange 27.

Figure 3:
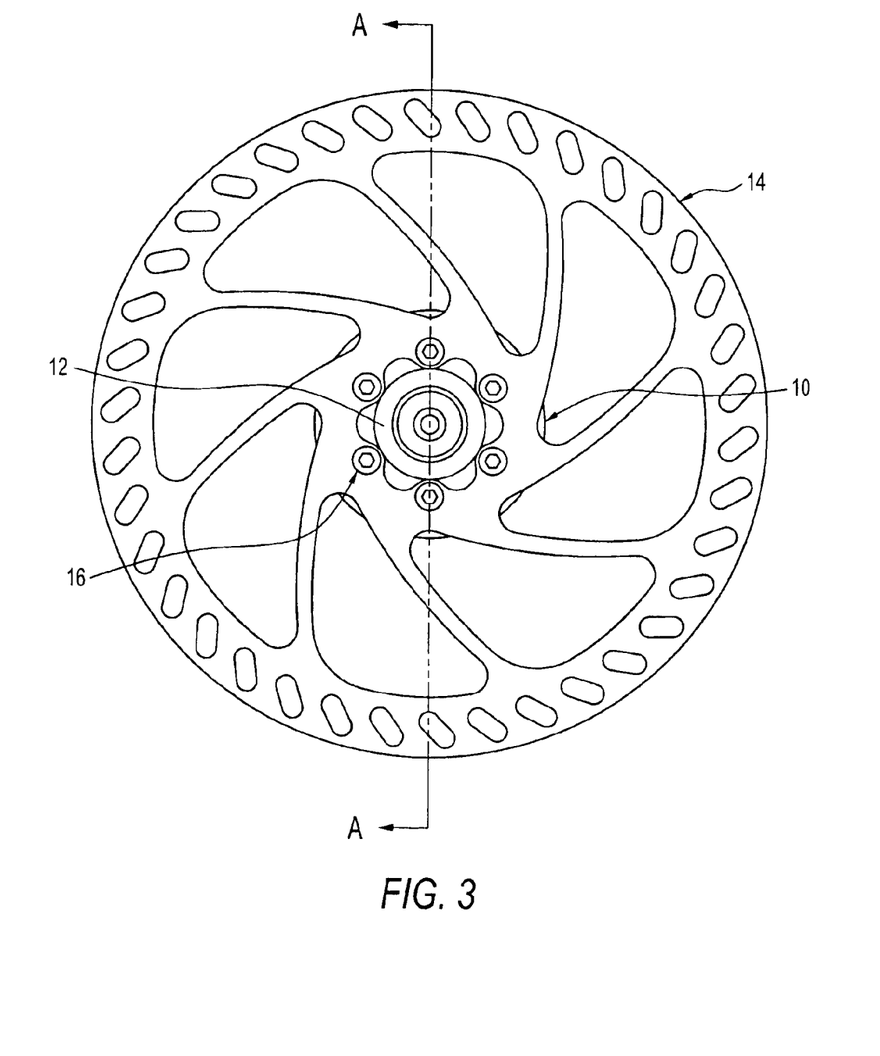
FIG. 3 is a front plan view of the hub adapter and various components in FIG. 1.

FIG. 3 is a front plan view of the various components shown in FIGS. 1 and 2. The disc brake rotor 14 is shown fastened to the hub adapter 10 by six threaded rotor fasteners 16 located according to a recognized international industry standard. It can be appreciated that although this international industry standard fastener position is preferred, alternative fastener positions and/or quantity could be conceived that would not depart from the invention. Also, the overall size of the brake rotor 14 may vary without affecting the principle of the invention.

Figure 4:
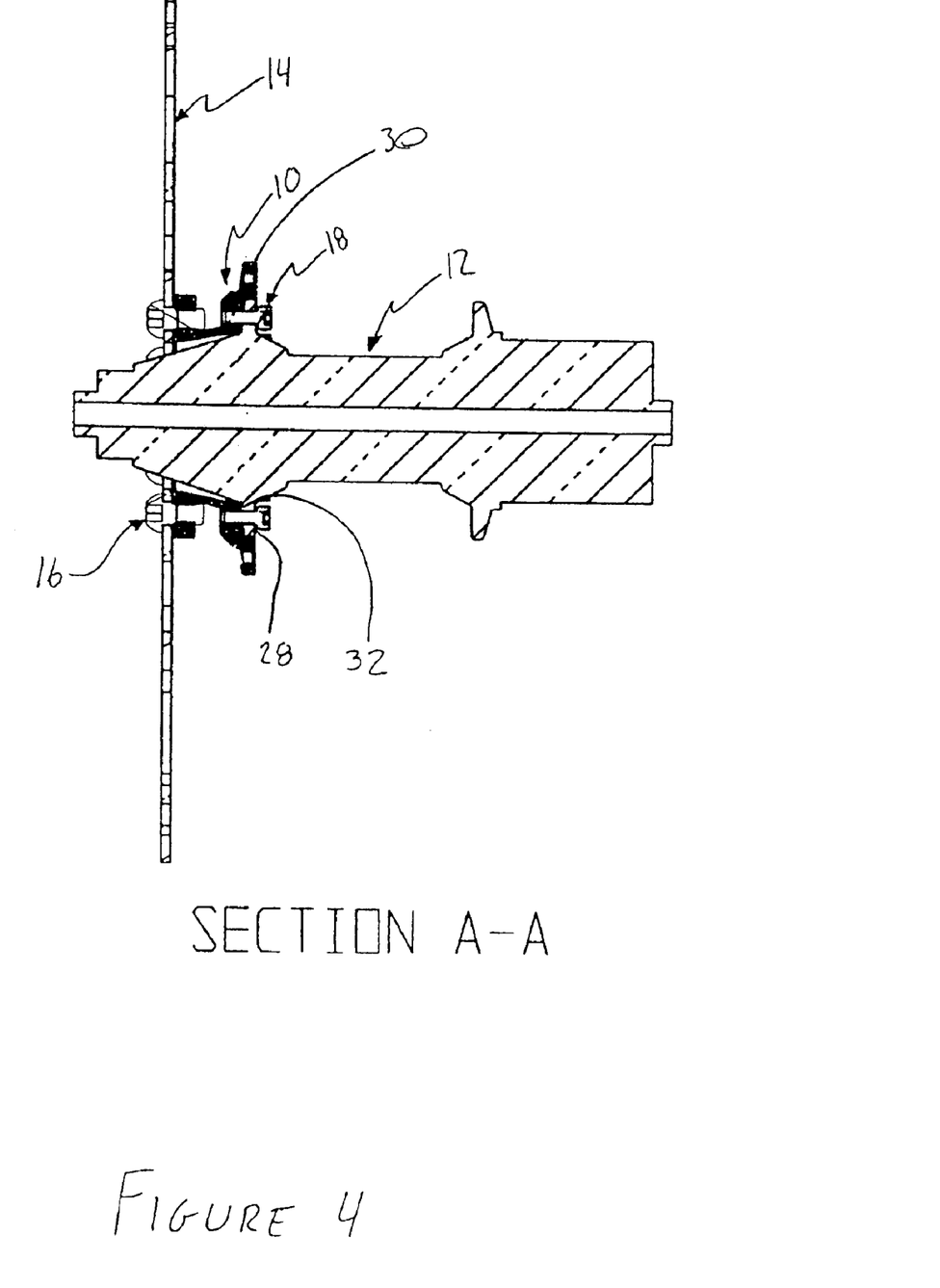
FIG. 4 is a cross section view taken through line A—A of FIG. 3.

FIG. 4 is a cross section view of the various components shown in FIGS. 1, 2 and 3, taken through line A—A of FIG. 3. The bicycle wheel hub 12 is shown in schematic cross-section, with no internal components shown. The spoke flange 28 on the bicycle wheel hub 12 sits flush against the hub mounting face 32 of the hub adapter 10 and the bicycle wheel hub 12 and hub adapter 10 are secured by threaded hub fasteners 18.

Figure 5:
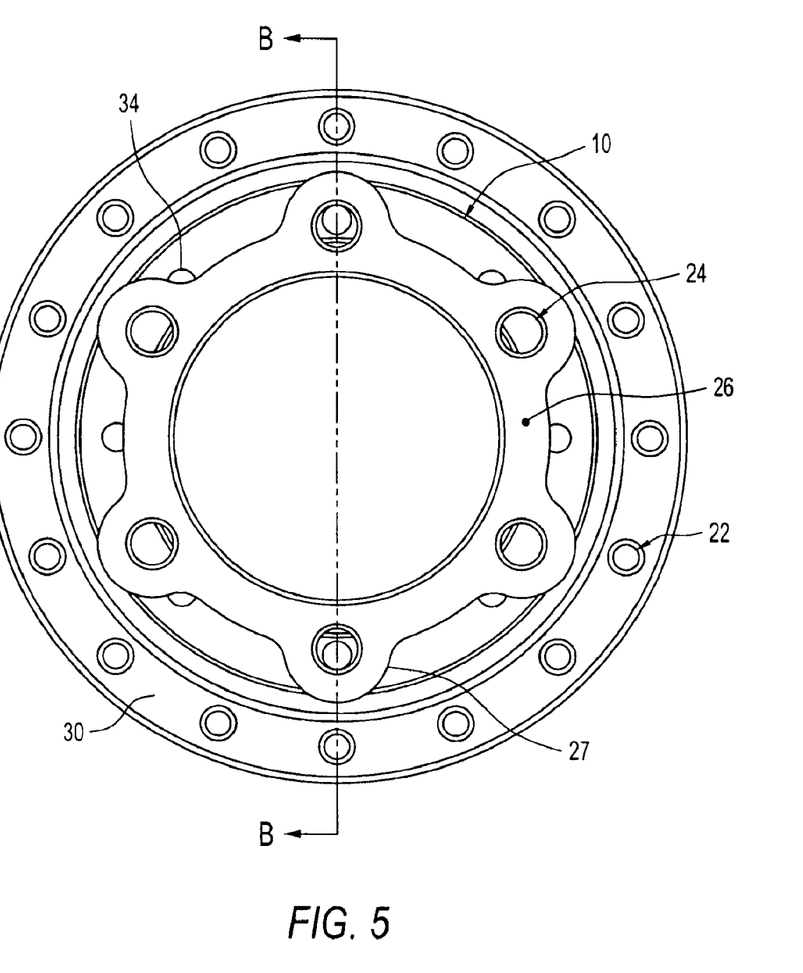
FIG. 5 is a front plan view of the hub adapter in FIG. 1.

FIG. 5 is a front plan view of the hub adapter 10. The disc brake rotor mounting face 26 of the rotor mounting flange 27 and the threaded receiving holes 24 for fastening the disc brake rotor are visible. Behind the rotor mounting flange 27 are the spoke holes 22 and threaded holes 34 for receiving the spokes and threaded hub fasteners, respectively (spokes and threaded hub fasteners not shown).

Figure 6:
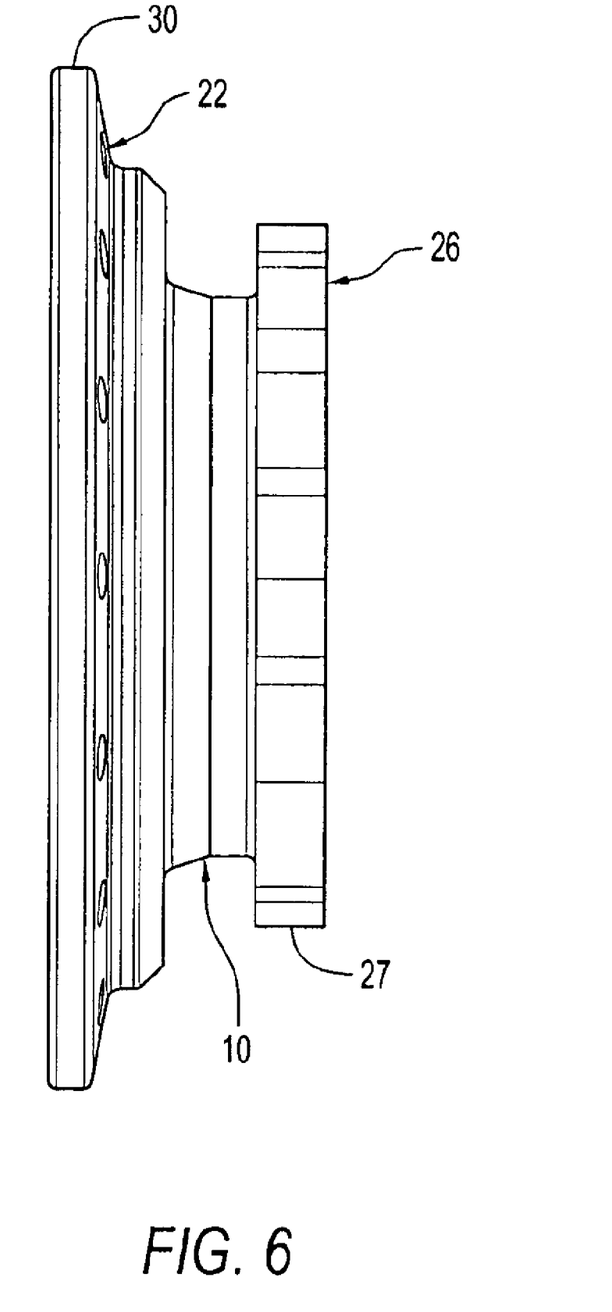
FIG. 6 is a side view of a hub adapter similar to that illustrated in FIG. 5.

FIG. 6 is a side view of the hub adapter 10, similar to that shown in FIG. 5. FIG. 6 shows that the disc brake rotor mounting face 26 is flat to allow for proper installation of the disc brake rotor, (not shown) whereas the surface of adapter spoke flange 30 may be tapered to allow wheel spokes passing through the spoke holes 22 to be mounted in the correct position and with minimal strain.

Figure 7:
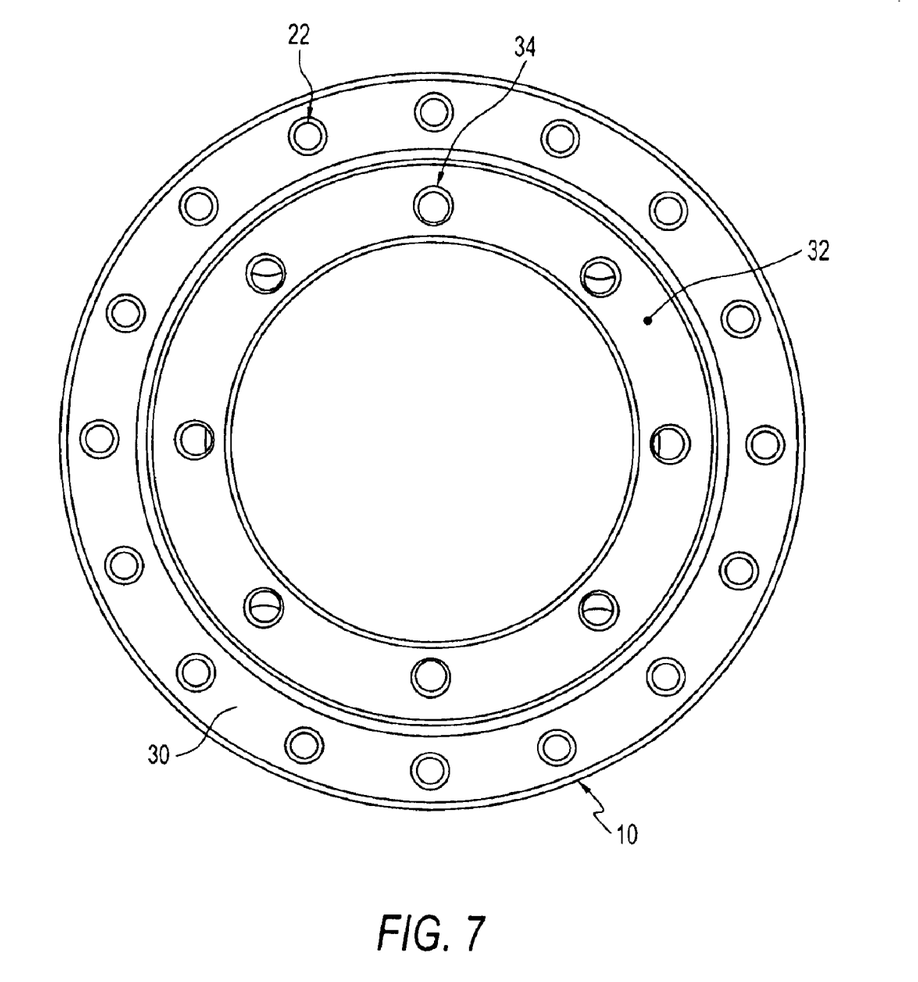
FIG. 7 is a rear plan view of a hub adapter similar to that illustrated in FIG. 5.

FIG. 7 is a rear plan view of the hub adapter 10. FIG. 7 shows the hub mounting face 32 on the hub adapter 10 to which the spoke flange 28 (FIG. 4) mounts. Threaded holes 34 are shown to which the threaded hub fasteners 18 (see FIG. 1) are secured. The spacing and pitch circle diameter of the threaded holes 34 match the location of the spoke holes 20 of the bicycle wheel hub 12 (see FIGS. 1 and 2). While eight threaded holes 34 are shown, any number of holes to a maximum equal to the number of spoke holes 20 (FIG. 2) may be conceived. FIG. 7 further shows that the new spoke holes 22 provided on the hub adapter 10 are located at the same angular spacing, but on a larger pitch circle diameter than the spoke holes 20 on the bicycle wheel hub 12, (see FIGS. 1 and 2) which coincide with the positions of the threaded receiving holes 34.

Figure 8:
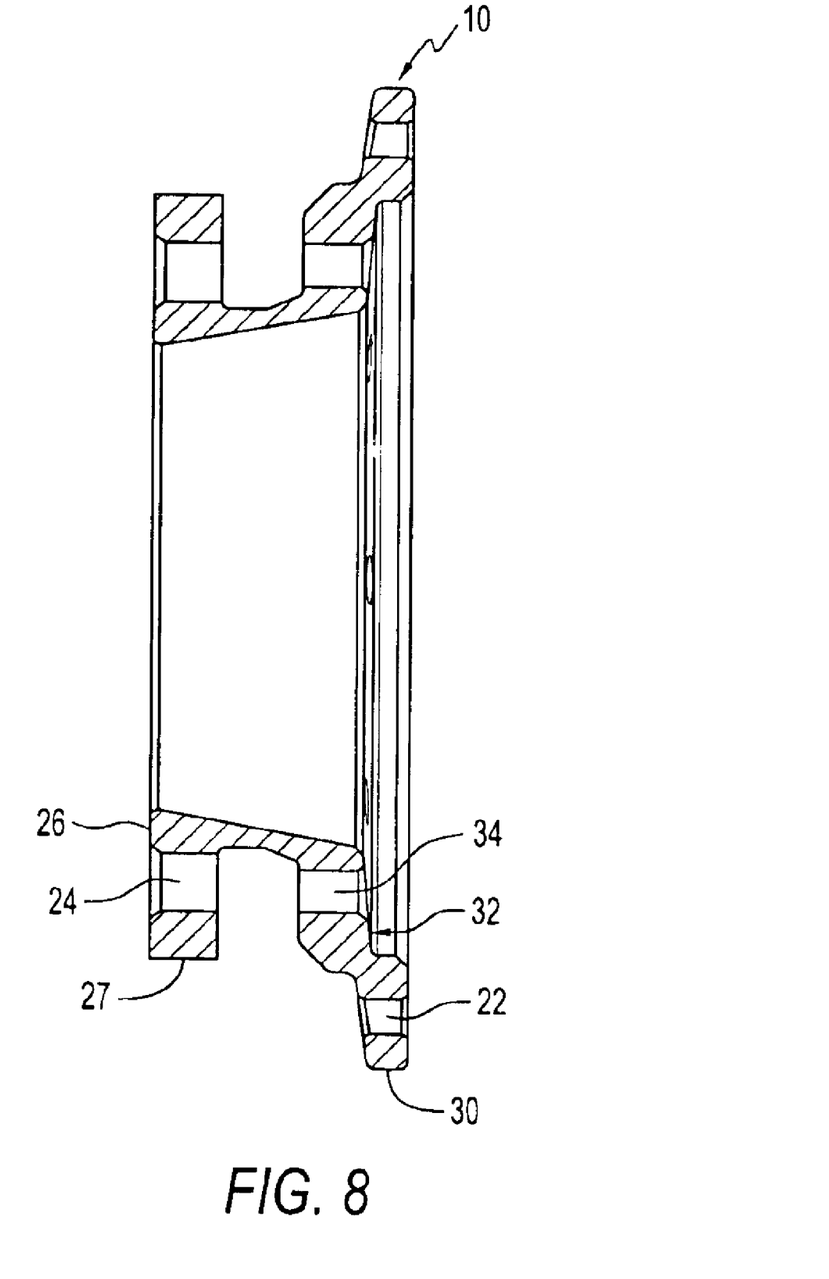
FIG. 8 is a cross-section view taken through line B—B of FIG. 5.

FIG. 8 is a cross-section view of the hub adapter 10, taken through line B—B of FIG. 5. The hub mounting face 32 on the hub adapter 10 is shown to be tapered in this instance, to match the shape of the mating surface of spoke flange 28 on the host bicycle wheel hub 12 (see FIGS. 1 and 4) so that the hub adapter 10 may be securely fastened by threaded hub fasteners 18 (see FIGS. 1 and 2) to the host bicycle wheel hub 12 (see FIGS. 1 and 2).

Figure 9:
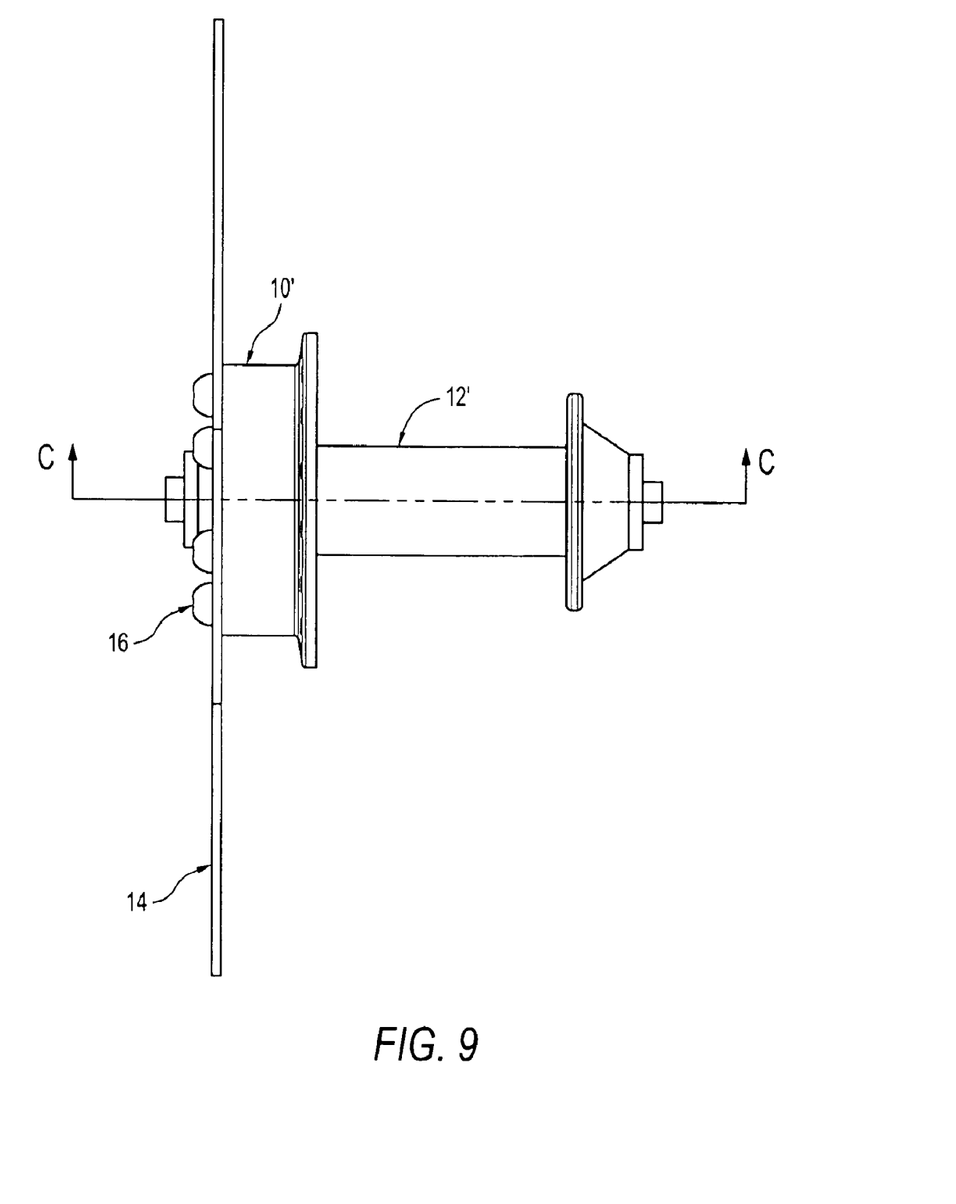
FIG. 9 is a side view of a hub adapter similar to that shown in FIG. 1, but for a front wheel hub.

FIG. 9 is a side plan view of an alternate embodiment of the present invention, shown as intended for use on a front wheel of a bicycle. In this version the hub adapter 10' is shown attached to a front bicycle wheel hub 12'. In a similar manner to that illustrated in FIG. 1, a disc brake rotor 14 is shown fastened to the hub adapter 10' by threaded rotor fasteners 16.

Figure 10:
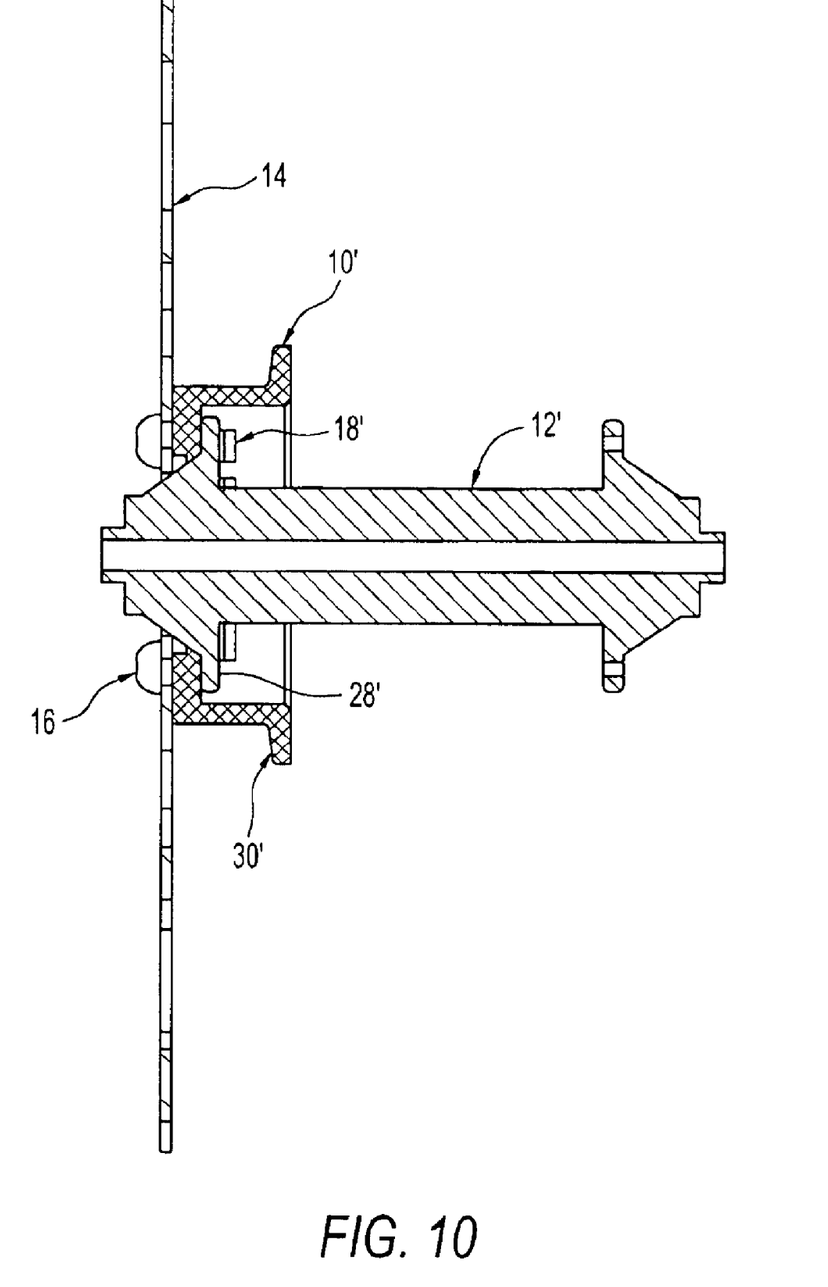
FIG. 10 is a cross-section view taken through line C—C of FIG. 9 and illustrating the flange offset typical of a front wheel hub application.

FIG. 10 is a cross-section view taken through line C—C of FIG. 9. In this embodiment the hub adapter 10' is shown to be similarly fastened to the host bicycle wheel hub 12' by threaded hub fasteners 18' passing through the spoke holes on the existing spoke flange 28'. A significant offset is shown between the existing spoke flange 28' of the host bicycle wheel hub 12' and the new spoke flange 30' on the hub adapter 10'. This offset is required to reposition the wheel spokes to allow for the clear mounting and operation of additional disc brake system components such as the disc brake caliper. Unlike the embodiments of FIGS. 1–8, the embodiment of FIGS. 9 and 10 does not have a rotor mounting flange.

Figure 11A:
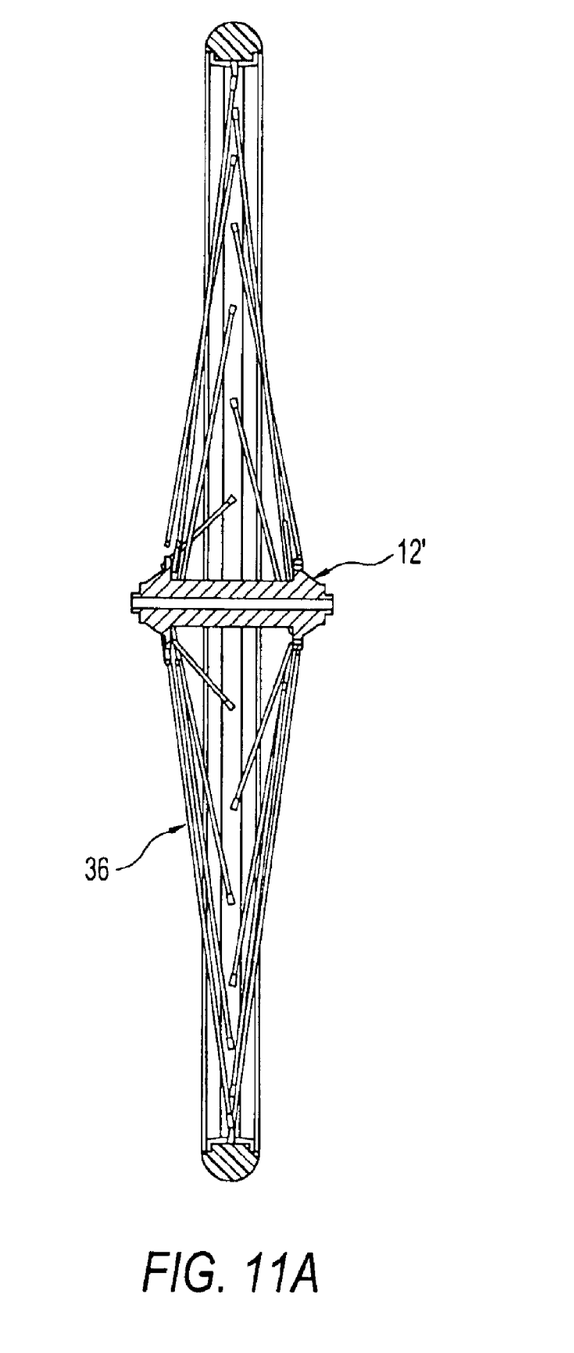
FIGS. 11a and 11b are of a cross section view similar to FIG. 10, but with a schematic representation of the disc brake caliper assembly and wheel and spoke assemblies added.
Figure 11B:
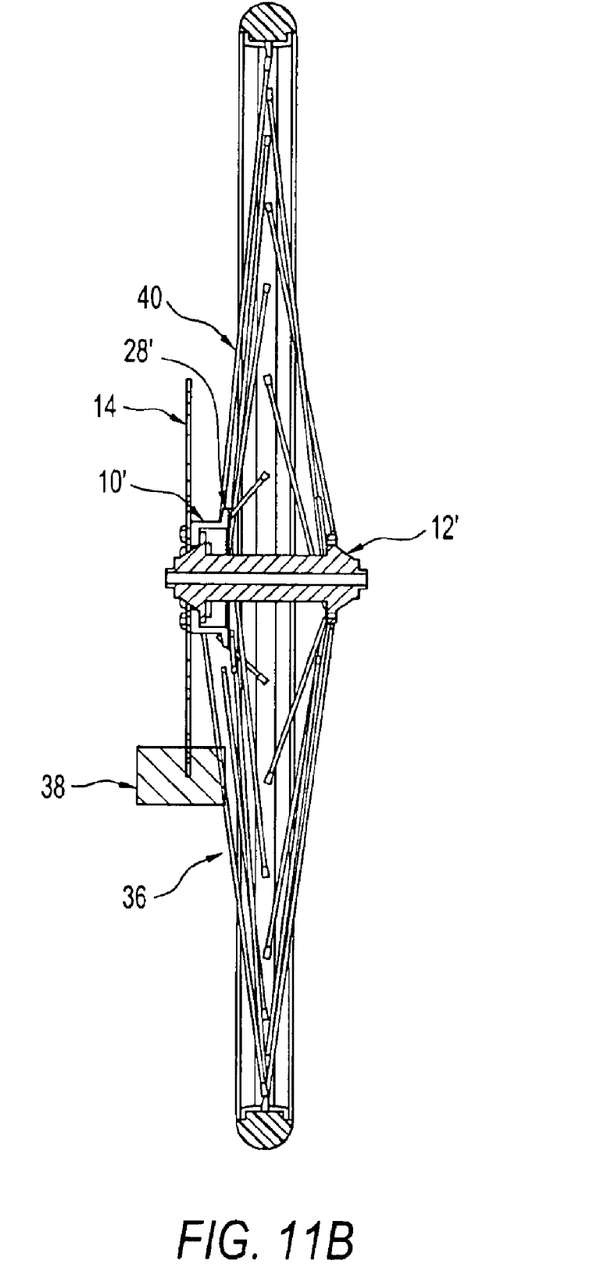

FIGS. 11a and 11b are of a cross-section view similar to FIG. 10, but with a schematic representation of a disc brake caliper assembly and a wheel and spoke assembly added. FIG. 11a shows how the wheel spokes 36 would typically be mounted to a host non-disc bicycle wheel hub 12', (i.e. a hub which is not specifically designed to accept a disc brake rotor). FIG. 11b shows the same host bicycle wheel hub 12' with a hub adapter 10' installed along with other key components of a disc brake system such as the disc brake rotor 14 and the disc brake caliper assembly 38. The new wheel spokes 40 fastened to the spoke flange 28' of hub adapter 10' are shown to provide adequate clearance for the mounting and operation of the disc brake caliper assembly 38. The original wheel spokes 36 (shown as ghost lines in FIG. 11b) are shown to interfere with the mounting position of the disc brake caliper assembly 38. It can also be seen in FIG. 11b that the location of the disc brake rotor mounting face 26 (see FIGS. 2, 5, 6 and 8) determines the positioning of the disc brake rotor 14 within the disc brake caliper assembly 38. The location and orientation of the rotor mounting face 26 and fastening points for the disc brake rotor 14 and the relocation of the wheel spoke flange 28' for brake caliper assembly 38 clearance are key elements of the present invention.

Figure 12:
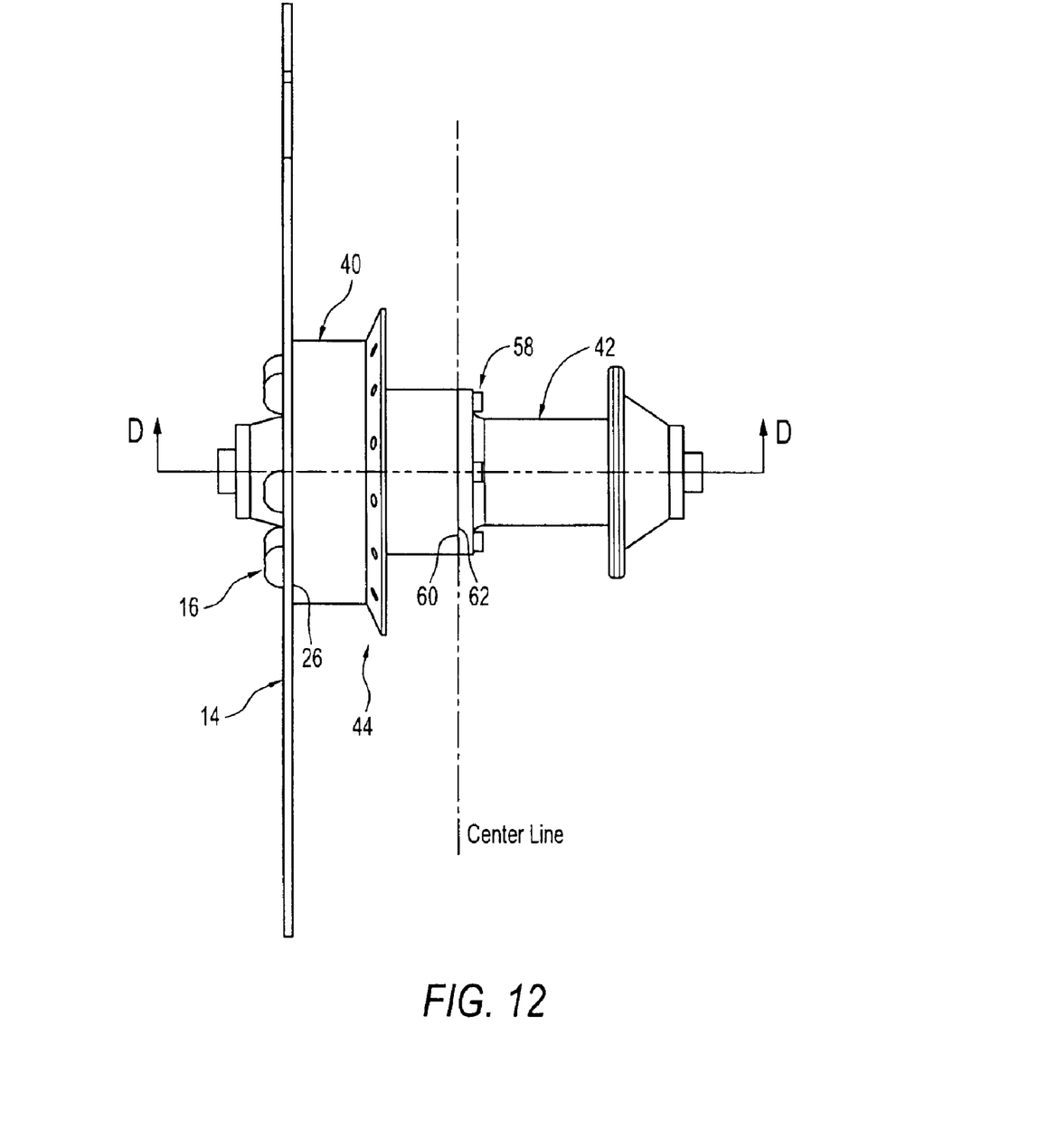
FIG. 12 is a side view of an alternate embodiment, where the hub adapter is specifically designed to be integral to a convertible wheel hub.

FIG. 12 is a side view of an alternative embodiment of the invention applicable to wheel hubs comprising two components. In FIG. 12 the hub adapter 40 is shown fastened to one such component 42. Although not shown in FIG. 12, the original wheel hub (non-disc wheel hub) comprises two hub components 42 fastened together along respective junction faces 60. With respect to the original non-disc hub (not shown), comprising two components 42 fastened together, the bearing assembly is contained within the non-disc hub in a manner similar to prior art hubs. Similarly, in the adapted disc hub shown in FIG. 12, comprising hub adapter 40 fastened to component 42, the bearing assembly (not shown) is contained within the adapted disc hub. Although in the embodiment of FIG. 12, junction face 60 lies at the centerline of the wheel, it is envisioned that the junction face 60 could also be displaced from the centerline. In this embodiment the hub adapter 40 replaces one hub component (not shown) and is fastened to the remaining hub component 42 by engaging the hub mounting face 62 of the adapter 40 with the junction face 60 of the component 42 using fasteners 58 or other means. Alternatively, the hub component 42 and adapter 40 could each be screw threaded such that they could be screwed together.

In the embodiment of FIG. 12 the hub adapter 40 is interchangeable with one of the two hub components 42, each of which comprises approximately one half of a wheel hub. The hub adapter 40 does not engage the spoke flange of the host wheel hub 42 as in the embodiments of FIGS. 1, 2 and 4. The principle of the invention is maintained in that the wheel hub (i.e. the host wheel hub component 42 and hub adapter 40) is adapted to mount a disc brake rotor 14, and/or the position of the spokes may be modified to accommodate the brake caliper assembly.

As in the previous embodiments discussed herein, the rotor 14 is fastened to the rotor mounting face 26 of the hub adapter 40 by threaded fasteners 16.

Figure 13:
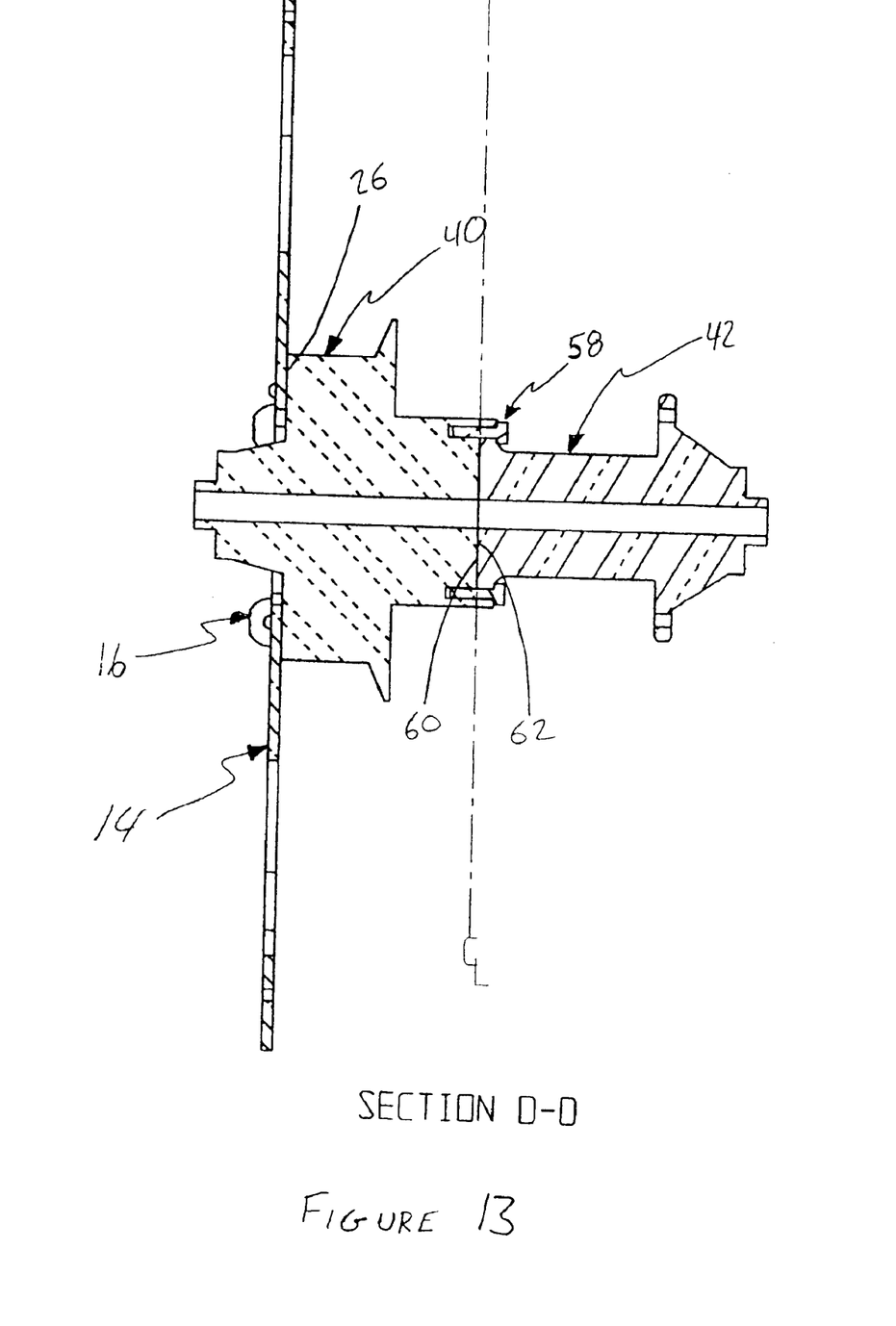
FIG. 13 is a cross-section view taken through line D—D of FIG. 12 and illustrating the alternate embodiment of the invention.

FIG. 13 is a cross-section view taken through line D—D of FIG. 12. The inside details of the host wheel hub 42 and the hub adapter 40 are shown schematically only. The resulting adapted wheel hub is made up of two separate pieces (40 and 42 in the configuration shown) fastened together.

The advantage of the embodiment of FIGS. 12 and 13 is that host wheel hub may be manufactured in two identical parts, (each part being identical to host wheel hub component 42) either one of which is interchangeable with the hub adapter 40. In the embodiments described in FIGS. 1–11, the hub adapter 10, 10' is fastened to an existing standard wheel hub 12, 12' whereas in the embodiment of FIGS. 12 and 13 one wheel hub component 42 is replaced with the hub adapter 40. It can be foreseen that the embodiment shown in FIGS. 12 and 13 could be supplied to retailers and consumers as either a non-disc specific wheel hub, (i.e. a wheel hub comprising a first wheel hub component 42 and a mirror of component 42), or as a disc specific wheel hub comprising a wheel hub component 42 and a hub adapter 40, with potential manufacturing cost savings to the manufacturer.

Although the in the embodiments of FIGS. 12 and 13 the host non-disc wheel hub comprises two substantially identical parts, (each part being substantially similar to host wheel hub component 42) it would be readily apparent to those skilled in the art that the host non-disc wheel hub could be made of two hub components that differ in size and/or shape.

A further embodiment of the present invention is envisioned adaptation of wheels having an integral hub (i.e. the hub, spokes and rim form one piece). In such integral hub wheels, the position of the spokes obviously cannot be altered to accommodate a disc brake assembly and/or disc brake rotor, therefore, the hub adapter could only be used in those instances where there is sufficient clearance for the disc brake assembly and disc rotor. In addition, alternative means for fastening the hub adapter to the hub may be necessary, since such integral hub wheels do not have spoke flanges 28 or holes 20 such as those shown in FIG. 2. For example the hub adapter may be bonded to the integral hub wheel using structural adhesive, or the hub adapter may comprise two complementary halves that may be fastened together about the hub of the integral hub wheel.

Although various embodiments of the present invention have been described in the context of their application to bicycle wheels, this invention is obviously applicable to wheels of other vehicles (e.g. wheelchairs).

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

We claim:

1. A hub adapter for mounting a disc brake rotor to a hub of a non-disc wheel, said hub adapter comprising:
   a) a hub mounting face for fastening said hub adapter to a spoke flange of said hub;
   b) an adapter spoke flange for fastening spokes of said wheel to said hub adapter; and
   c) a rotor mounting face for fastening said rotor to said hub adapter;
   wherein a circumference of said adapter spoke flange is greater than a circumference of said spoke flange of said hub.

2. A hub adapter according to claim 1, wherein said hub mounting face is operative to engage a spoke flange of said hub.

3. A hub adapter according to claim 1, wherein said hub mounting face comprises threaded holes for receiving threaded fasteners that pass through spoke holes of a spoke flange of said hub to fasten said hub adapter to said hub.

4. A hub adapter according to claim 1, wherein said hub mounting face is tapered.

5. A hub adapter according to claim 1, wherein a surface of said adapter spoke flange is tapered.

6. A hub adapter according to claim 1, wherein said adapter spoke flange is offset toward a centerline of said wheel relative to a spoke flange of said hub when said adapter is fastened to said hub.

7. A hub adapter according to claim 1, wherein spoke holes of said adapter spoke flange have a substantially identical angular spacing, but a larger pitch circle diameter than spoke holes of a spoke flange of said hub.

8. A hub adapter according to claim 1, wherein said rotor mounting face comprises threaded receiving holes for receiving threaded fasteners that pass through holes of said rotor to fasten said rotor to said hub adapter.

9. A hub adapter according to claim 1, wherein said hub adapter is in the form of a cylindrical ring.

10. A hub adapter according to claim 1, wherein said hub is a hub for a front wheel of a bicycle.

11. A hub adapter according to claim 1, wherein said hub is a hub for a rear wheel of a bicycle.

12. A hub adapter for mounting a disc brake rotor to a hub of a non-disc wheel, said hub adapter having a substantially cylindrical form with a rotor end and a hub end, said hub adapter comprising:
   a) a hub mounting face extending circumferentially about an interior of said hub adapter and near said hub end, for fastening said hub adapter to a spoke flange of said hub;

b) an adapter spoke flange extending circumferentially about an outside of said adapter for fastening spokes of said wheel to said hub adapter; and c) a rotor mounting face at said rotor end for fastening said rotor to said hub adapter.

13. A hub adapter according to claim 12, wherein said hub mounting face is operative to engage a spoke flange of said hub.

14. A hub adapter according to claim 12, wherein said hub mounting face comprises threaded holes for receiving threaded fasteners that pass through spoke holes of said spoke flange of said hub to fasten said hub adapter to said hub.

15. A hub adapter according to claim 12, wherein said hub mounting face is tapered.

16. A hub adapter according to claim 12, wherein a surface of said adapter spoke flange is tapered.

17. A hub adapter according to claim 12, wherein said adapter spoke flange is offset toward a centerline of said wheel relative to a spoke flange of said hub when said adapter is fastened to said hub.

18. A hub adapter according to claim 12, wherein spoke holes of said adapter spoke flange have a substantially identical angular spacing, but a larger pitch circle diameter than spoke holes of a spoke flange of said hub.

19. A hub adapter according to claim 12, wherein said hub mounting face is located at said hub end of said hub adapter.

20. A hub adapter according to claim 12, wherein said rotor mounting face comprises threaded receiving holes for receiving threaded fasteners that pass through holes of said rotor to fasten said rotor to said hub adapter.

21. A hub adapter according to claim 12, wherein said hub is a hub for a front wheel of a bicycle.

22. A hub adapter according to claim 12, wherein said hub is a hub for a rear wheel of a bicycle.

* * * * *